(12) United States Patent
Heath et al.

(10) Patent No.: US 8,985,848 B2
(45) Date of Patent: Mar. 24, 2015

(54) THERMAL INSPECTION SYSTEM

(75) Inventors: Brian Heath, Edmonton (CA); Tse Young (Fred) Ko, Edmonton (CA); Gurcharn Lotey, Edmonton (CA)

(73) Assignee: BDC Capital Inc., Calgary (CA)

( * ) Notice: Subject to any disclaimer, the term of this patent is extended or adjusted under 35 U.S.C. 154(b) by 0 days.

(21) Appl. No.: 11/772,791

(22) Filed: Jul. 2, 2007

(65) Prior Publication Data

US 2008/0028846 A1 Feb. 7, 2008

Related U.S. Application Data (60) Provisional application No. 60/806,365, filed on Jun. 30, 2006.

(51) Int. Cl.
*G01J 5/00* (2006.01)
*G01K 1/00* (2006.01)
(Continued)

(52) U.S. Cl.
CPC .................................. *G01M 17/027* (2013.01)
USPC ............... 374/121; 374/4; 374/129; 374/141; 374/57; 374/124

(58) Field of Classification Search
CPC ..... G01N 25/72; G01J 5/08; G01J 2005/0077
USPC ......................... 374/121, 129, 141, 4, 57, 124
See application file for complete search history.

(56) References Cited

U.S. PATENT DOCUMENTS 2,999,151 A * 9/1961 Rosett ........................ 246/169 D
4,977,586 A * 12/1990 Curry .............................. 378/61

(Continued)

FOREIGN PATENT DOCUMENTS

JP 2005351705 A * 12/2005

OTHER PUBLICATIONS

Federal Motor Carrier Safety Administration, "Evaluation of Infrared Brake Screening Technology," Publication No. FMCSA-MCRT-02-100, Jul. 2002, 4 pages.

(Continued)

*Primary Examiner* — Mirellys Jagan
(74) *Attorney, Agent, or Firm* — Christensen O'Connor Johnson Kindness PLLC (57) ABSTRACT

The method and apparatus to automatically inspect or pre-screen the Equipment of passing CMVs employs the novel application of acquiring, processing and analyzing the temperature data from areas of interest on passing wheels using a computer based imaging system to improve the efficiency of current CMV inspecting and/or pre-screening manual methods that require an inspection system operator. The inspection system includes a triggering device, thermographic camera(s), computer based image acquisition hardware, image processing and analysis software, user interface and operator workspace (herein referred to as the "Inspection System"). The components of the apparatus are not limited to the list above nor are all components required to embody the method for inspection or pre-screening of equipment of passing CMVs. The method is a means of collecting the thermal information of the Equipment as it passes through an Inspection Area and analyzing it to determine or estimate its condition or fitness. The thermal properties of passing Equipment is used to analyze for anomalies and comparison to thermal properties of Equipment in good working condition, or thermal properties of other similar equipment on the same CMV. Test results that lie outside the parameters of either absolute or relative test rules-for-fitness are flagged and pulled out of the flow of traffic for further investigation.

9 Claims, 5 Drawing Sheets

(51) Int. Cl.
*G01N 25/72* (2006.01)
*G01M 17/02* (2006.01)

(56) References Cited

U.S. PATENT DOCUMENTS

| | | | |
|---|---|---|---|
| 5,677,533 A * | 10/1997 | Yaktine et al. | 250/342 |
| 5,730,526 A * | 3/1998 | Davis et al. | 374/45 |
| 5,743,645 A * | 4/1998 | Jaynes | 374/137 |
| 6,540,858 B1 * | 4/2003 | Caretta et al. | 156/110.1 |
| 6,712,502 B2 * | 3/2004 | Zalameda et al. | 374/5 |
| 7,208,733 B2 | 4/2007 | Mian | |
| 2001/0022802 A1 * | 9/2001 | Kurata | 374/45 |
| 2004/0071186 A1 * | 4/2004 | Ignatowicz | 374/139 |
| 2004/0245467 A1 * | 12/2004 | Lannestedt | 250/330 |
| 2004/0246470 A1 * | 12/2004 | Burns et al. | 356/139.09 |
| 2005/0145794 A1 * | 7/2005 | Faubion | 250/330 |
| 2005/0259273 A1 * | 11/2005 | Mian et al. | 356/601 |
| 2006/0114531 A1 * | 6/2006 | Webb et al. | 359/15 |
| 2006/0170768 A1 * | 8/2006 | Riley | 348/143 |
| 2006/0180760 A1 * | 8/2006 | Lane et al. | 250/339.05 |
| 2007/0030349 A1 * | 2/2007 | Riley | 348/143 |
| 2007/0064244 A1 * | 3/2007 | Mian et al. | 356/601 |
| 2007/0211145 A1 * | 9/2007 | Kilian et al. | 348/148 |
| 2008/0036580 A1 * | 2/2008 | Breed | 340/438 |
| 2009/0018721 A1 * | 1/2009 | Mian et al. | 701/33 |
| 2009/0030558 A1 * | 1/2009 | Rogers et al. | 700/297 |
| 2009/0073425 A1 * | 3/2009 | Kling et al. | 356/139.09 |
| 2009/0256693 A1 * | 10/2009 | Brinton et al. | 340/439 |

OTHER PUBLICATIONS

Thermal Eye Technologies, "Infrared Inspection Systems," on-line catalog, 1997, <www.thermaleyetech.com>, 3 pages.

* cited by examiner

Fig 2
Detail of [25] in Fig4

Automated pre-screening/ inspection of wheels and brakes using thermal imaging

8.

11. AXLE 3 RHS – Overheated bearing 95%
12. AXLE 5 LHS – Non – working Brake 73%
AXLE % RHS – Out of adjustment Brake 35%

10. Goto Sample Data

Wheel Inspection Reference

Trailer Axles    Drive Axles    Steer Axles

Historical Search

Automated pre-screening/inspection of wheels and brakes using thermal imaging

Examples of Test Rule Areas of Interest on individual wheel

Exposed Tire Tread Surface Area

18.

Bearing Heat

41.

Wheel surface area

19.

Tire retread anchor areas

THERMAL INSPECTION SYSTEM

CROSS-REFERENCE TO RELATED APPLICATIONS

This application claims the benefit under 35 U.S.C. §119(e) of U.S. Provisional Application No. 60/806,365, filed Jun. 30, 2006.

BACKGROUND

There is a need for an off-board method or apparatus to automatically pre-screen or inspect the fitness of the brakes, bearings, running gear, wheels, and/or tires (herein referred to as "Equipment") of commercial motor vehicles (CMVs) without disrupting a vehicle's travel. The engineering challenge has been to entirely automate a method to determine or approximate the condition of equipment that may be related to the safety of a passing CMV while minimizing the effect on the flow of commerce.

SUMMARY

The thermal inspection according to one embodiment to automatically inspect or pre-screen the Equipment of passing CMVs employs the application of acquiring, processing and analysing the temperature data from areas of interest (herein referred to as "Feature Areas") on passing wheels using a computer based imaging system to improve the efficiency of current CMV inspecting and/or pre-screening manual methods that require an inspection system operator. The inspection system may include a triggering device, thermographic camera(s), computer based image acquisition hardware, image processing and analysis software, user interface and operator workspace (herein referred to as the "Inspection System"). The components of the apparatus are not limited to the list above nor are all components required to embody the method for inspection or pre-screening of equipment of passing CMVs. In one embodiment, the method collects the thermal information of the Equipment as it passes through an Inspection Area and analysing it to determine or estimate its condition or fitness. The thermal properties of passing Equipment may be used to analyse for anomalies and comparison to thermal properties of Equipment in good working condition, or thermal properties of other similar equipment on the same CMV. Test results that lie outside the parameters of either absolute or relative test rules-for-fitness are flagged and pulled out of the flow of traffic for further investigation.

BRIEF DESCRIPTION OF THE DRAWINGS

There will now be described embodiments of a thermal inspection system, with reference to the drawings, by way of illustration only and not with the intention of limiting the scope of the thermal inspection system, in which like numerals denote like elements and in which:

FIG. 2 is an example of the preferred components of a graphical user interface for the automated thermal imaging inspection system for CMV Equipment;
8. vehicle description—preferably an image of the vehicle captured as it is passing through the inspection area
9. problem identification—a message area that identifies the identified problem with the brakes or wheels of a passing CMV
10. sample data—access to or a direct image of acquired thermal data that can be used by the operator to confirm problem identification
11. test results—information on the results of the analysis of collected sample data used to calculate the possibility of an unsafe wheel or brake
12. confidence level—a statistical quantification of the calculated accuracy (or nearness) of the automated analysis and test results to programmed test rules for problem identification.

FIG. 3 is a typical thermal image of a CMV wheel. There are many different hub styles, rim structures and tire sizes. There are also different viewing angles that the thermal cameras may be positioned for inspection at different sites. Therefore, the geometry of each feature area is dependent on CMV wheel rim style and viewing angle, but this figure serves to identify the common structures within a wheel image ("Feature Areas") that the Inspection System is trained to identify, analyse and apply to test rules.
13. Exposed brake drums
14. Outer perimeter of facing wheel sidewall
15. Wheel hub
16. Tire sidewall surface area
17. Exposed tire tread surface area
18. Wheel bearing area
19. Tire retread anchor areas

DETAILED DESCRIPTION

In this patent document, the word "comprising" is used in its non-limiting sense to mean that items following the word in the sentence are included and that items not specifically mentioned are not excluded. The use of the indefinite article "a" before an element means that one of the elements is specified, but does not specifically exclude others of the elements being present.

An embodiment of an automated thermal inspection system for the identification of unsafe CMV Equipment may comprise the integration of the following components. Each of these components is defined below.

Automated Thermal Inspection System: An exemplary Inspection System described in this patent application.

Inspection Area: [42] The area of the laneway through which vehicles pass through the Automated Thermal Inspection System. It is within the Inspection Area that information is gathered on passing vehicles in order to determine if the vehicle's equipment is unsafe or requires further investigation for the onset of unsafe equipment conditions that lead to equipment failure.

Inspection Triggering Device: [1] an automated triggering device that may be used to identify the presence of a passing vehicle into the Inspection Area.

Thermographic Camera: [2] An example of electro-optical equipment used to gather data on the thermal energy patterns of passing vehicles. Cooled and uncooled Thermography equipment is widely used for a variety of inspection systems that use thermal energy patterns to ascertain the condition of objects of interest.

Inspection Processor: [6] The electronic hardware of a vision system that includes image acquisition hardware [20] and a computer. The image acquisition hardware of a machine vision system includes an analog frame grabber, for example a National Instruments frame grabber NI P/N 777 959-01—IMAQ PCI 1422 (RS-422). The apparatus is not limited to only using this equipment; other analog or digital frame grabbers can be used.

System Workstation: [5] Comprised of the necessary computer peripherals and accessories to facilitate the operation of the equipment by inspection personnel.

Inspection Software: [40] Software for image processing [21] and analysis [22] to support the automated inspection or pre-screening functionality of the system. Additionally, the Inspection Software may includes a graphic user interface [FIG. 2] and appropriate supporting I/O devices [24] to facilitate the operation of the inspection system by personnel. Additionally, the Inspection Software [25] [FIG. 2] is configurable to supporting and correlating data inputs from multiple thermography cameras [2] and integrating vehicle trigger/ presence equipment [1] to create an electronic file for each passing vehicle [37] and for each inspected wheel of same vehicle. Software may include a graphical user interface [FIG. 2] [25] to display data to inspection personnel.

Figure 2:
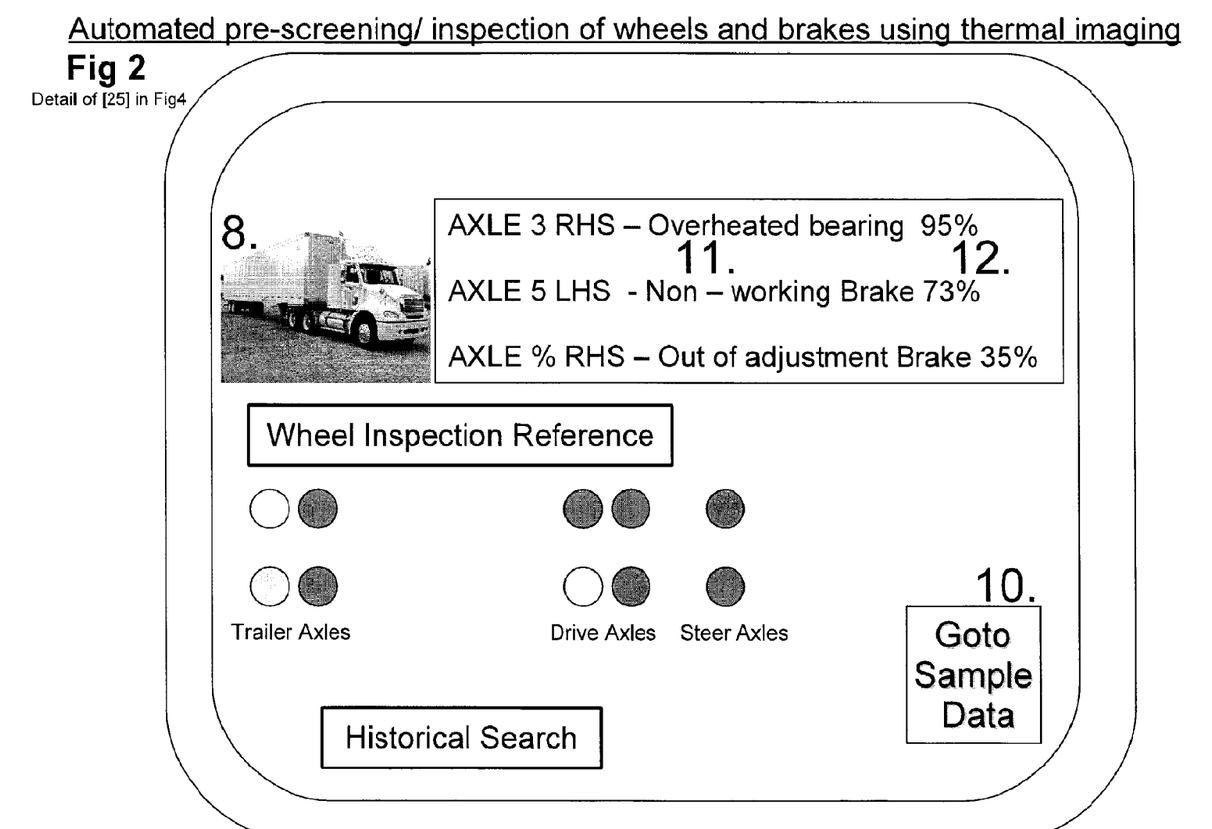

Core Processing Algorithms: (Herein referred to as "Software Test Algorithms") [23] The mathematical constructs used to support the analysis of inspection data and its application against a set of configured rules by measuring statistical properties [36] between collected vehicle sample sets to population data sets pre-installed on the system [38]. Statistically significant deviations, lack of fit, or other statistical tools are used to determine the probability of faulty equipment on passing vehicles [38], [39] and trigger notification protocols [24] in the inspection software [25]. Examples of these processing algorithms are listed in the Software Test Algorithms Section.

Unsafe Equipment; The condition of a vehicle's brake system [13], running gear [15], tires [14] [16] [17] [19], wheels [41], bearings [18] and/or axles [18] [15] that are, or show signs of, becoming impaired or inoperative such that the safe operation of the vehicle may be impaired. This can include but is not limited to inoperative brakes, out of adjustment brakes, overheated brakes, overinflated tires, underinflated tires, separating retreads, overheated bearings, locked wheels, equipment on fire, missing tires, and other missing and/or faulty equipment.

Figure 1:
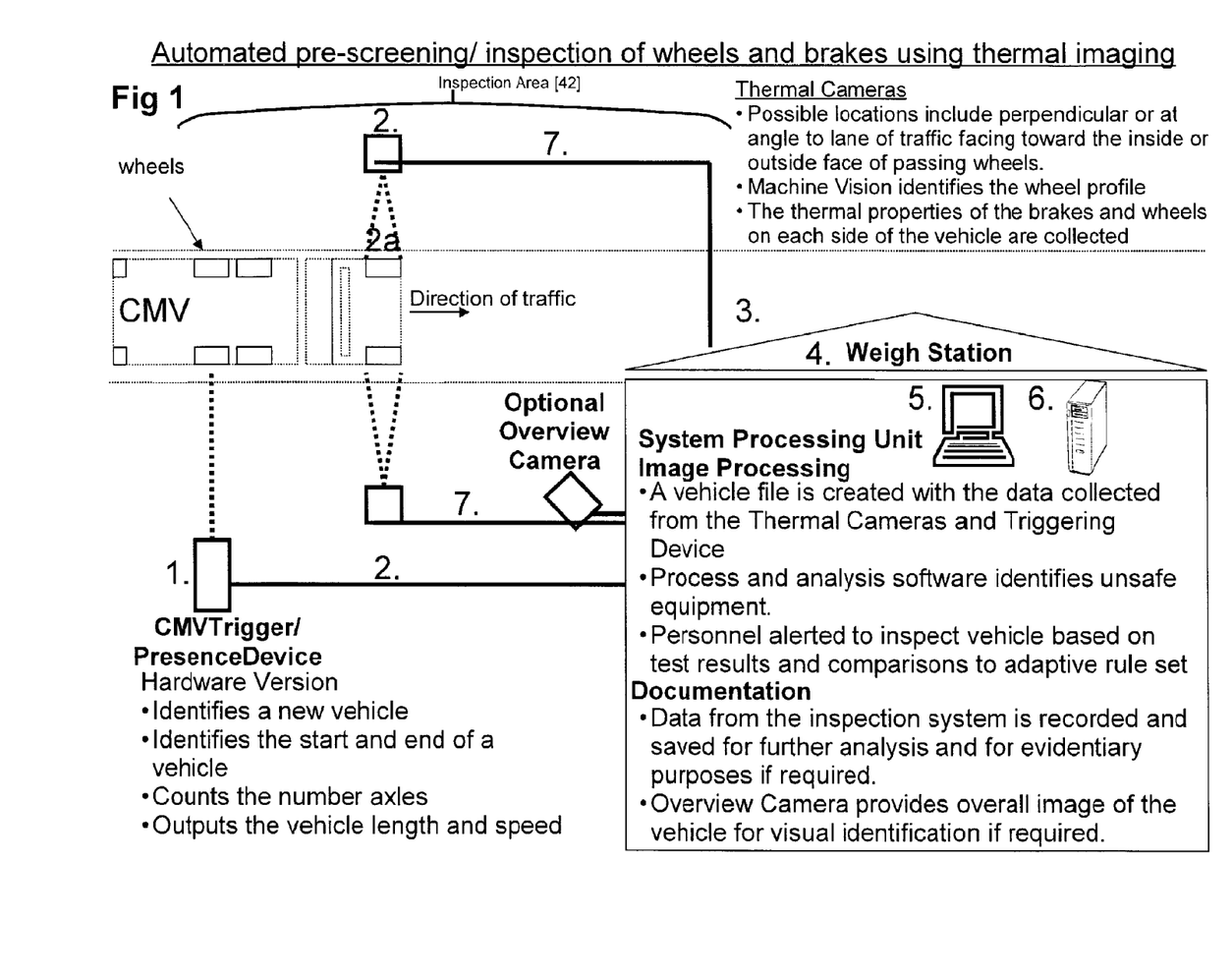
FIG. 1 is the layout and typical componentry of an automated thermal imaging brake inspection system;
1. thermography camera
2. triggering device
3. laneway
4. typical weigh station scale house
5. scale house inspection system workstation
6. inspection processing unit
7. data communication

An example of a Method and apparatus for Automatically Inspecting Wheels and Brakes of Vehicles is laid out in FIG. 1. The exact choice or placement of the components described in FIG. 1 is not critical to the ability to successfully create an inspection system. The components of the system provide the capability to automatically collect thermal energy patterns on the passing Equipment of vehicles as it passes through the Inspection Area [42] and to process [21] and analyze [22] that data in order to identify whether the vehicle should be pulled over [38] [39] to further investigate the working condition of its wheels or brakes. Triggering components [1] may for example be separate devices or embedded software solutions to identifying and determining the presence of a passing vehicle. Thermography cameras [2] may for example be directed toward the inside or outside face of passing wheels and placed either perpendicularly to the flow of traffic or at offset angles to improve the reliability of the inspection system. Various types or brands of thermography camera now known or hereafter developed may be used that capture the thermal information to identify CMV Equipment that is potentially unsafe by the Inspection System.

Data Communication Equipment [7] may employ wired or wireless technology and is also not constrained to a specific brand or type. The Data Communications Module meets the operational needs of the Inspection System. The System Processing Unit [6] may for example be located remotely at the inspection station [4]. An alternate embodiment would locate the Processing Unit [6] onboard the thermography camera [2] or at the roadside.

The System Software must be capable of processing [21] and analysing [22] the collected data in order to determine the possibility of unsafe Equipment on passing vehicles and alerting inspection personnel [FIG. 2] of each incident.

A thermal inspection system for automatically inspecting CMV Equipment embodies a new and improved method and apparatus for inspecting and/or pre-screening the performance of CMV Equipment. In one embodiment, the automated system is designed to employ a novel integration of absolute temperature readings from passing brakes and wheels using modern thermographic equipment [2] with the past success of relative manual thermal testing to improve the efficiency of inspecting and/or pre-screening by automating the process and discontinuing the need for an inspection system operator until a vehicle is already flagged for possible equipment concerns. An embodiment of the thermal inspection system involves the installation of thermographic equipment [2] on either side of a laneway [3] used by passing trucks. The thermal sensors [2] can either be positioned facing the inside or outside of passing wheels.

In one embodiment, the minimum number of sensors to inspect all the wheels and brakes of a passing CMV is to use one for each side of a passing axle set, though additional sensors may be added to improve the statistical performance of the following suggested algorithms. An Inspection System may also only be made up of one thermographic camera [2], though this reduces the available field of views [2a] for data collection and analysis. The positioning of the thermographic camera(s) [2] and lensing will determine the field of view [2a] for image capture [20] and must be taken into consideration when programming the Inspection Software's [40] feature analysis [29] and pattern matching [30] functions An exemplary thermographic camera equipment is the FLIR A40M Researcher uncooled Microbolometer. The apparatus, however, can use other uncooled and cooled thermographic cameras instead of the FLIR A40M Researcher. Examples include, but are not limited to other FLIR Thermovision, ThermaCam, Merlin, and Phoenix series cameras; Electrophysics Emerald and Jade series cameras.

Figure 3:
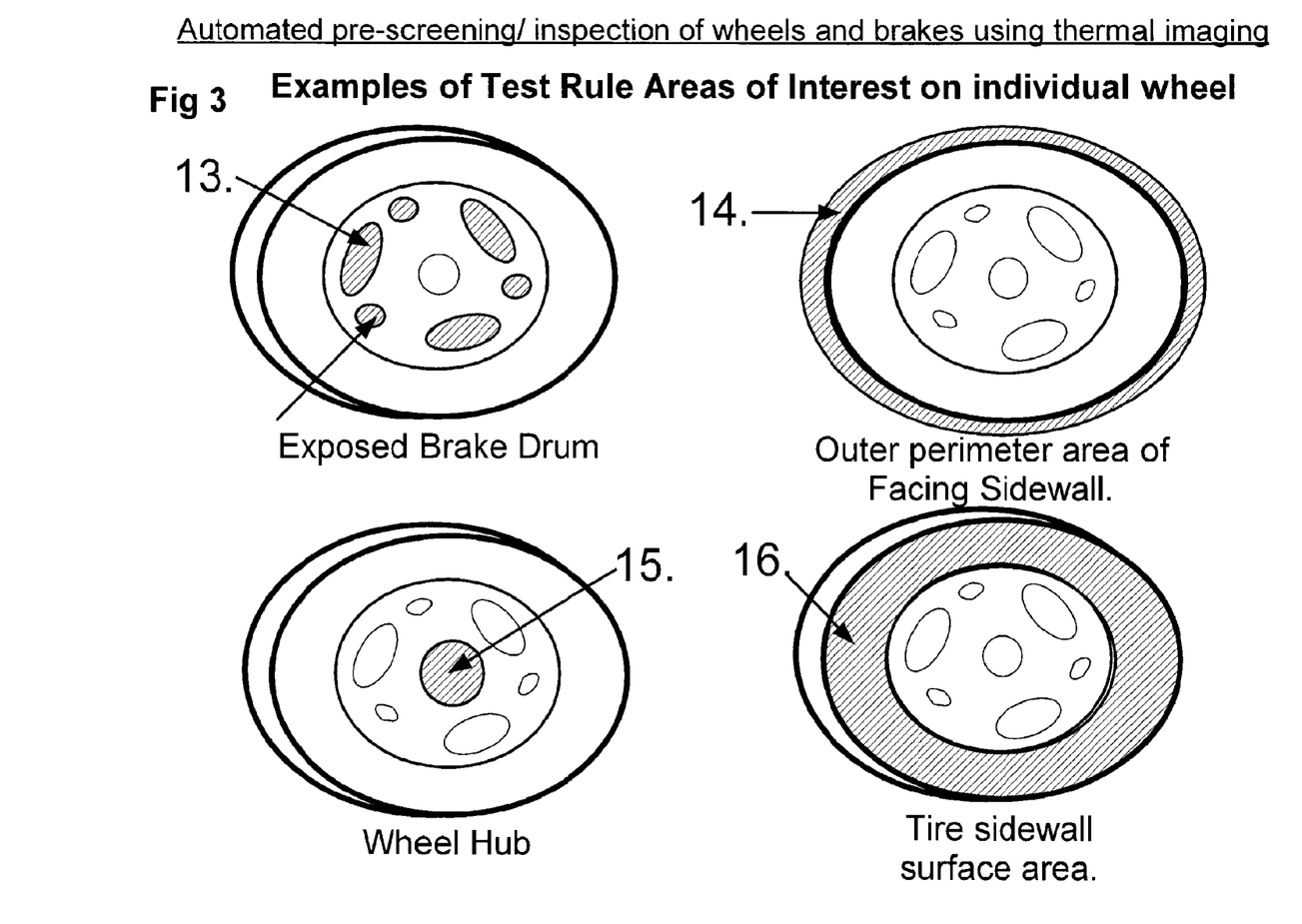

Not all weigh stations [4] and remote inspection/pre-screening sites are designed the same. Therefore, the one or more Thermographic Cameras [2] are positioned and lensed to facilitate automated inspection and pre-screening for each deployment site. The one or more Thermographic Cameras [2] are set for example in a fixed position with optical lenses specified to meet the required focal distance so that passing Equipment areas of interest [FIG. 3] pass through the designated field of view [2a] for each Thermographic Camera [2].

Data from the wheels of each CMV is associated with a vehicle start-and-end identifier for a specific CMV. There are various methods for creating and separating individual CMV files automatically. An exemplary embodiment involves the integration of a scanning laser to be used as an Inspection Triggering Device [1] to determine the entrance and exit of a new vehicle into the path of the thermographic cameras. An exemplary equipment is the OSI Autosense II laser scanner.

Other possible vehicle identifiers include but are not limited to light walls, active laser, active and passive infrared, ultrasonic, radar, machine vision iterations, other software solutions and in ground sensors such as conductive loops, plates, and weigh-in-motion systems. A factor to be considered with the choice of the Inspection Triggering Device [1] should be the reliability with which they operate.

Figure 4:
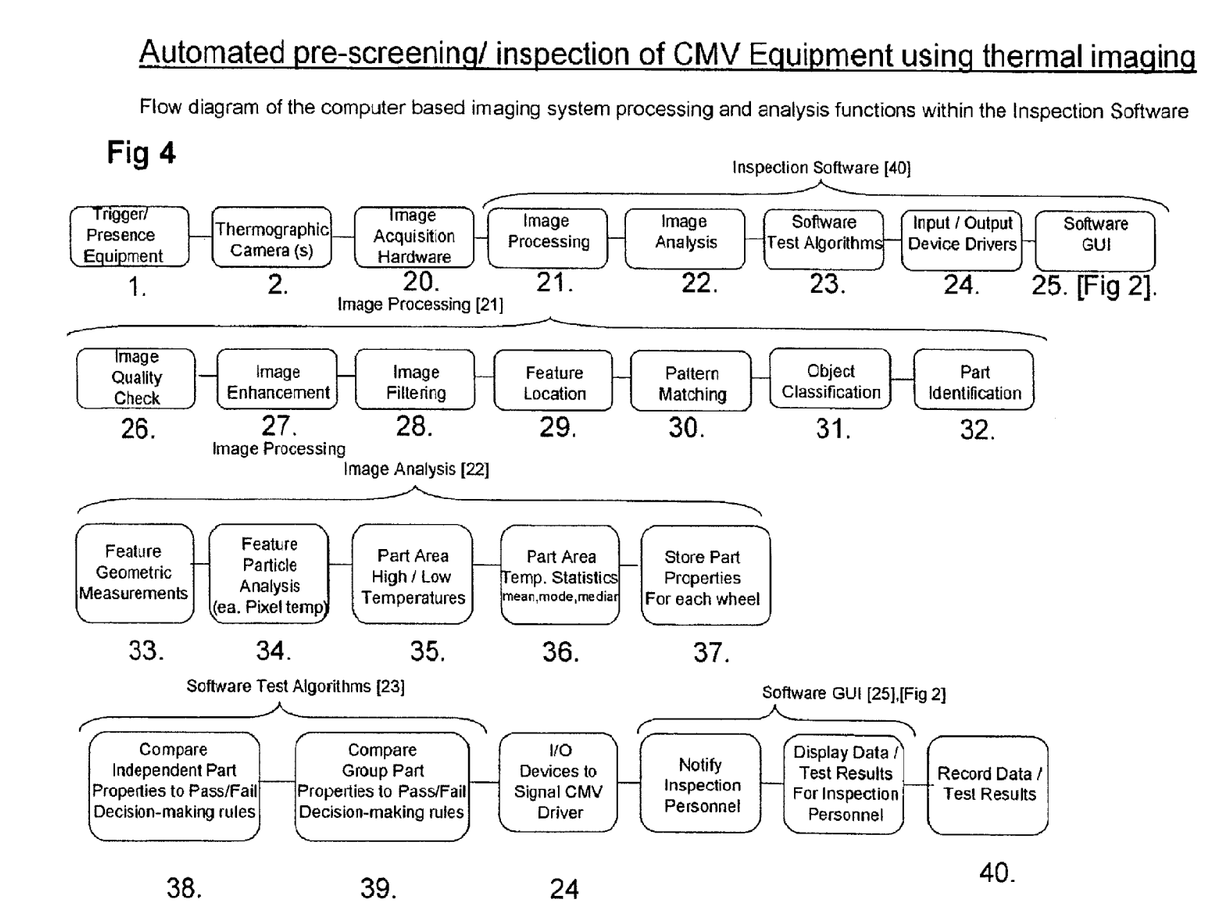
FIG. 4 is a flow diagram of the computer based imaging system processing and analysis functions within the Inspection Software

The Thermographic Camera [2], optics and the Inspection Triggering Device [1] are connected to the rest of a computer-based image acquisition system. [FIG. 4] Raw data is captured by the image acquisition hardware [20] (herein called the "System Processor") so that it can be processed [21] and analyzed [22] by the inspection system software [40] (herein called "Inspection Software").

Image acquisition, analysis and processing are performed by the System Processor [6] and Inspection Software. [40] The Inspection Software [40] is the application software that includes vision software tools to process [21] and analyze [22] inspection images. Image processing and analysis tools may include image quality check [26] and enhancement [27], filtering [28], feature location [29], pattern matching [30], object classification [31], part identification [32], and feature measurement [33]. Image analysis [22] may include measurement [33], particle analysis [34] and statistics [35] [36]. The software detects the presence or absence of a wheel [30] in each image, processes and analyses the image, and identifies differences among objects within one or more images against pass/fail decisions [38] [39]. FIG. 4 details the method used by the Inspection Software [40] to process and analyze images for inspection/pre-screening. Other embodiments of the thermal inspection system can change the order of these processing/analysis steps and modify the tools used to process/analyze images, but the basic functionality will remain the same; to identify the presence of CMV Equipment in an image and analyze the properties of Equipment image against a set of decision making rules.

The preferred machine vision analysis tools are embedded in the Inspection Software [40] and may for example be offered by Labview™ machine vision software and vision development module from National Instruments. Image processing and analysis tools are used to determine the surface temperature properties of areas of interest within each passing wheel image for relative testing based on novel and simple algorithms [23]. Parameters such as mean temperature [36], lowest temperature [35], and highest temperature [35] within identified areas [32] for each wheel image are collected and compared to data from other wheel images [39] and against established criteria [38] to perform comparative and absolute testing.

The Inspection System in one exemplary embodiment computes the possibility of unsafe Equipment in the following manner: Using accepted statistical analysis, the individual temperature properties [35] [36] each passing identified [32] piece of Equipment are compared to either an absolute test range [38] or to the average temperature properties for all similar Equipment on the same CMV [39]. Individual Equipment found to deviate either from the acceptable test range and/or significantly from other similar Equipment of the same CMV triggers an I/O device [24] that communicates with a serial device to control a variable message sign or other indicator hardware and the CMV is pulled over for further inspection. A system notification would automatically alert staff (see GUI, FIG. 2) downstream of the flagged CMV to inspect the vehicle for Unsafe Equipment. One method is to locate the thermographic camera(s) [2] on a ramp leading to a permanent weigh station [4] facility so that staff are available to carry out investigations once vehicles have been identified by the automated pre-screening system. However, this thermal inspection system may be deployed in remote locations and the identification of CMVs flagged for inspection may be transmitted by wired or wireless communications [7] to inspection staff at a nearby permanent facility or in mobile units.

The use of absolute temperature data for each passing piece of equipment and its relative comparison to test ranges [38] and/or the rest of the Equipment on an individual CMV [39] is a novel integration of existing technology and prior art to create a new method and apparatus of automatically pre-screening CMVs for unsafe Equipment.

This method of automatically flagging CMVs with potentially unsafe Equipment has other possible applications outside the CMV market. Examples include railway car brakes, airplane brakes, and the running gear of any vehicle with a braking system.

Advantage of certain embodiments of this automated inspection and/or pre-screening method and apparatus include in some cases the elimination of an equipment operator, a dramatic increase in the number of vehicles that can be inspected and/or pre-screened for unsafe equipment without interfering with the flow of commerce, and a reduction in the cost current manually controlled thermal imaging inspection equipment because of the use of low-cost fixed thermographic cameras [2] versus the pan/tilt functionality of thermographic cameras currently used for high volume pre-screening of CMVs in the market.

The low cost structure of this solution may allow law enforcement agencies to deploy a greater number of these systems on their respective roads and dramatically increase the number of CMVs that can be inspected or pre-screened for safety while being driven in their jurisdictions. The end result of this increased testing may be an increase in issued violations and a removal of more unsafe CMVs from the road. This holds the potential to lower the number of crash incidents and the financial and human cost of crashes involving large trucks in North America.

Software Test Algorithms [23] can identify more than just individual unsafe Equipment. The algorithms may learn to distinguish patterns of passing thermal signatures that identify multiple Equipment problems on a single CMV. These adaptive algorithms can be improved as more data is collected from passing trucks and a database is developed to compare system flags to inspection outcomes. These improved algorithms can expand the functionality of the initial system to identify not only unsafe wheels and brakes, but also compute a predictive measure for time-to-failure.

The complexity of multiple instances of malfunctioning Equipment on a single CMV stems from the multitude of reasons that individual pieces of equipment or groups of equipment may exhibit different thermal patterns than the average one identified for an individual CMV. Examples include but are not limited to an entire set of cold brakes for CMVs just beginning their journey, a cold set of tractor brakes when truckers employ trailer brakes only, a cold set of trailer brakes when the air system is not working properly, a cold signature for drop axles only recently dropped when entering the inspection area, an entirely cold set of brakes when truckers employ jake brakes (engine retarder brakes), and brakes that are legally out of adjustment but still working. The creation of a database improves the functionality of the automated pre-screening system's ability to predict a safety violation on passing CMVs. Each improvement in the functionality of the automated Inspection System provides a further increase in the effectiveness of CMV safety enforcement to identify safety issues not otherwise detectable by the human eye on passing CMVs. These improvements leverage the advantage of Inspection System by flagging an increasing number of possible safety violations detected and improving the overall effectiveness of inspection personnel.

An exemplary method of automatically inspecting and/or pre-screening to detect unsafe Equipment on passing CMVs for a single lane of traffic is described in detail below. The designer determines the most effective placement and position of the Triggering Device [1] and Thermographic Camera(s) [2]. This system can be designed to collect the thermal data of the Equipment of passing CMVs from either the outside or inside face of passing CMV wheels. The system can be designed to employ a single camera per axle side or to use redundant cameras along the plane of travel to improve the predictability of collected data. Multiple cameras can improve data collection because there is no set standard for operators to apply their truck brakes when entering an inspection area. Multiple cameras my also be used when the cycle time for employed thermographic cameras is too slow to accurately collect thermal data on passing CMVs. Multiple temperature measurements along the plane of travel increase the chance of capturing data and thereby improving the chance of reliable data collection for the inspection/pre-screening process.

Once the thermographic camera(s) [2] have been positioned, machine vision programming can be used to 'teach' the cameras to recognize the round shapes of wheels, identify rim patterns, wheel patterns, and wheel hubs for all CMV rim styles and to take temperature readings of specific Feature Areas (FIG. 3) of interest within these areas. In thermography, the photoelectric processes that convert light energy into electric signals produce images by assigning relative values to the individual pixels of an electronic image. These pixel values are related to the light energy that interacts with each element of the photoelectric sensor and can be used interpret a thermal image via the electronic signal it produces. Machine vision programming can then be used to analyze the pixel values within specific feature areas as a method of extracting useful thermal information for analysis. The information from each area of interest for each passing wheel is collected [20] and placed into an electronic vehicle file along with the data collected from other wheels on the same CMV. The integration of the thermographic camera(s) [2] with a suitable trigger [1] enables the automated system to distinguish between different CMVs and group the data from multiple wheels within individual vehicle files. This triggering device [1] may be either hardware or software based. The data within a specific vehicle file provides input data for the automated analysis and inspection/pre-screening of the CMV equipment. The input data is analysed using developed algorithms [23] to determine if the anomalies collected from wheel data supports further investigation. Algorithm development is based on both absolute temperature test ranges and the comparative analysis of absolute temperatures measured by the thermographic cameras for all the wheels for a single CMV. Software Test Algorithms FIG. 4

| Test | Type of Test | Rules |
| --- | --- | --- |
| Inoperative Brake (s) | Pass/Fail based on Absolute/Relative temperature test comparisons | Flag brakes [13] <60% avg. temp. of all brakes on CMV excluding outliers |
| Inoperative Brakes (s) | Pass/Fail based on Absolute temp. test comparison | Flag brakes [13] <20 degrees Fahrenheit average temperature |
| Out of Adjustment Brakes | Pass/Fail on Relative temperature test to predict time-to-failure | Flag brakes [13] <30% avg. temp. of all brakes on CMV excl. outliers. |
| Overheated Brakes | Pass/Fail on Absolute temp. test | Flag brakes [13] >500 degrees Fahrenheit avg. temp. on any brake. |
| Overheated Bearings | Pass/Fail on Absolute temp. test | Flag brakes >500 degrees Fahrenheit avg. temp. on any wheel's bearing [15] heat. Bearing heat excludes hub heat and surrounding visible brake drum heat and tire heat. |
| Flat Tires | Pass/Fail on Absolute/Relative temp test. | Flag tire [14] when area representing outer 5% of tire sidewall surface perimeter is >100% of remaining avg. visible tire area temp AND other CMV tires do not exhibit same pattern excl. outliers. |
| Separating Re-Treads on Tires | Pass/Fail on Absolute/Relative temp test. | Flag tire when area between outer 5% and 10% of tire sidewall [19] surface area perimeter is >100% of remaining avg. visible tire area temp AND other CMV tires do not exhibit same pattern excl. outliers. |
| Over-Inflated Tires | Pass/Fail on Absolute/Relative temp. test | Flag tire when tread surface [17] temp exhibits non-uniform temperature so that centre 50% of tread surface is >50% hotter than the remaining 25% of the tread surface on either side of the centre. |
| Under-Inflated Tire (s) | Pass/Fail on Absolute/Relative temp. test | Flag tire when tread surface [17] temp exhibits non-uniform temperature so that centre 50% of tread surface is <50% hotter than the remaining 25% of the tread surface on either side of the centre. |
| Miss-Sized Tire (s) | Pass/Fail on Absolute/Relative temp. test AND size comparison calculation | Flag tire when tire surface [16] is >25% avg. temp. of other tires on SAME CMV axle set AND machine vision tire area calculation [33] determines a statistically significantly size difference in tire diameter with a 99% confidence interval. |
| Missing Tire (s) | Pass/Fail on Absolute tire size calculation | Flag tire if machine vision calculated tire diameter [33] is <15% size of remaining tires on SAME axle set and hub bearing [15] heat is <50% of avg. bearing heat on other wheels of SAME axle set. |
| Tire(s) on Fire | Pass/Fail on Absolute temp calculation | Flag tire if avg. temperature on entire visible surface area of wheel [41] is greater than 750 degrees Fahrenheit. |

-continued

| Test | Type of Test | Rules |
| --- | --- | --- |
| Unsafe load configuration | Pass Fail on absolute/ Relative temp calculation. | Flag CMV if average entire sidewall area [16] temp. for all visible tires on one side of trailer is >50% than those of the other side of the trailer. |

Notes to Software Test Algorithms

The above Software Test algorithms [23] are not limited to the specific rule sets listed. The rule logic is a predictive model based on configured algorithms. However, to be truly effective, these rule sets can be made adaptive. Adaptive rule sets allows the Inspection System software to be updated and improved to account for the data collected at the same or other inspection sites. Adaptive rule sets can be changed manually or programmed automatically to update the Absolute and/or Relative rules to reflect the results of past inspections. The refinement of these rules sets is an expected outcome of the continued testing and comparison of actual results to the Inspection Systems determined or predictive results. The aim is to make the automated system as accurate as possible in determining or predicting Equipment issues on passing CMVs.

The invention claimed is:

1. A method of inspecting a commercial motor vehicle, the method comprising:
    while a commercial motor vehicle is passing along a laneway in a flow of traffic in an inspection area of a vehicle inspection station, upon the commercial motor vehicle triggering a trigger device, acquiring a thermal image of a portion of wheel equipment relating to a wheel of the commercial motor vehicle at a vehicle inspection station;
    providing a database of data on malfunctioning equipment collected from multiple other commercial motor vehicles;
    automatically creating an electronic file uniquely relating to the commercial motor vehicle, the electronic file comprising the thermal image;
    automatically identifying the portion of wheel equipment as a vehicle equipment component;
    automatically performing a statistical analysis of the thermal image to determine the probability of faulty equipment on the commercial motor vehicle by comparing the thermal image with the data on malfunctioning equipment in the database to identify one or more of inoperative brakes, out of adjustment brakes, overheated brakes and overheated bearings; and
    based on the statistical analysis, determining whether the vehicle should be subject to further inspection, and upon determining that the vehicle should be subject to further inspection, pulling the commercial motor vehicle from the flow of traffic for further inspection.

2. The method of claim 1 in which the thermal image is displayed for an operator.

3. The method of claim 1 in which acquiring the thermal image comprises acquiring the thermal image with a first thermographic camera mounted to the side of a roadway at the vehicle inspection station and acquiring a second thermal image of the wheel with a second thermographic camera located along the plane of travel of the commercial motor vehicle.

4. The method of claim 1 in which the database comprises data on malfunctioning equipment based on comparison of system flags to inspection outcomes.

5. The method of claim 1 in which automatically performing a statistical analysis of the thermal image to determine the probability of faulty equipment on the commercial motor vehicle is carried out by comparing the thermal image with data in the database to identify whether each of inoperative brakes, out of adjustment brakes, overheated brakes and overheated bearings is present.

6. The method of claim 5 in which acquiring the thermal image comprises acquiring the thermal image with a first thermographic camera mounted to the side of a roadway at the vehicle inspection station and acquiring a second thermal image of the wheel with a second thermographic camera located along the plane of travel of the commercial motor vehicle.

7. The method of claim 1 in which the thermal image is acquired with a first thermographic camera mounted to the side of a roadway at the vehicle inspection station for imaging of the outside of wheels of moving vehicles.

8. Apparatus for selecting motor vehicles for further inspection, the apparatus comprising a system processor configured with software for carrying out the method steps of claim 7.

9. The apparatus of claim 8, further comprising:
    a trigger device operatively connected to the system processor, the trigger device being sensitive to moving vehicles to send a signal to the system processor to acquire images uniquely related to the vehicle.

* * * * *